United States Patent
Ellis et al.

(10) Patent No.: US 10,718,550 B2
(45) Date of Patent: Jul. 21, 2020

(54) EXTREMELY FAST ALCOHOL-BASED SOLVENT CHILLER

(71) Applicants: Daniel Scott Ellis, Clinton, UT (US); Steven Joseph Parkinson, Clinton, UT (US); Steven Victor Boyce, Spanish Fork, UT (US); William Grant Moon, Provo, UT (US)

(72) Inventors: Daniel Scott Ellis, Clinton, UT (US); Steven Joseph Parkinson, Clinton, UT (US); Steven Victor Boyce, Spanish Fork, UT (US); William Grant Moon, Provo, UT (US)

(73) Assignee: Reflect Scientific Inc., Provo, UT (US)

( * ) Notice: Subject to any disclaimer, the term of this patent is extended or adjusted under 35 U.S.C. 154(b) by 0 days.

(21) Appl. No.: 16/224,469

(22) Filed: Dec. 18, 2018

(65) Prior Publication Data

US 2020/0191448 A1 Jun. 18, 2020

(51) Int. Cl.
| | |
|---|---|
| *F25B 19/00* | (2006.01) |
| *F17C 3/00* | (2006.01) |
| *F17C 7/00* | (2006.01) |
| *B01D 11/02* | (2006.01) |
| *C11B 1/10* | (2006.01) |

(52) U.S. Cl.
CPC ........ *F25B 19/005* (2013.01); *B01D 11/0292* (2013.01)

(58) Field of Classification Search
CPC .......... F17C 2227/03; F17C 2227/0367; F17C 2227/0369; F17C 2227/0374; F17C 2227/0379; F17C 2227/0381; F17C 3/00; F17C 7/00; F17C 7/02; F17C 7/04; F25B 19/00; F25B 19/005; B01D 11/02; B01D 11/0288; C11B 1/10; C11B 3/006
See application file for complete search history.

(56) References Cited

U.S. PATENT DOCUMENTS

| | | | | | |
|---|---|---|---|---|---|
| 3,418,081 | A | * | 12/1968 | Graver | ...... G05D 9/00 422/111 |
| 5,123,250 | A | * | 6/1992 | Maric | ...... B01D 5/0006 62/49.2 |
| 2015/0300569 | A1 | * | 10/2015 | Baust | ...... F17C 1/00 62/50.1 |
| 2015/0362128 | A1 | * | 12/2015 | Sanglan | ...... F17C 6/00 62/50.2 |
| 2019/0134531 | A1 | * | 5/2019 | MaHannah | ...... B01D 11/028 |

\* cited by examiner

*Primary Examiner* — Frantz F Jules
*Assistant Examiner* — Erik Mendoza-Wilkenfel
(74) *Attorney, Agent, or Firm* — Patent Law Office PC; Bao Tran

(57) ABSTRACT

An alcohol-based solvent chiller includes an insulated vessel; a spiral-shaped heat exchanger designed specifically to chill alcohol-based solvents that become viscous at low temperatures within the insulated vessel; a cryogenic tank with pressure building capability that will force coolant through the heat exchanger at a specific pressure; and a cryogenic pump to circulate viscous cryogenic temperature liquids within the insulated vessel.

17 Claims, 5 Drawing Sheets

EXTREMELY FAST ALCOHOL-BASED SOLVENT CHILLER

FIELD OF INVENTION

The preferred embodiment chills large quantities of alcohol-based solvents, such as Ethanol. In particular, it can chill 130 gallons of Ethanol from room temperature to −90 degrees C. in less than 3 hours.

BACKGROUND OF THE INVENTION

This invention has the advantage over current state-of-the-art alcohol based solvent chillers in that it significantly reduces the time required to chill alcohol-based solvents to ultra-low temperatures (−90 degrees C.) by several hours. The non-obvious design is accomplished by innovative designs taking advantage of the extremely cold liquid properties of Nitrogen while simultaneously overcoming the problems encountered with low temperature alcohol-based solvents.

It is to be understood that the term "Ethanol" as used in this document is to include any alcohol-based substance of similar properties to Ethanol and used for similar purposes.

The manufacture of Cannabinoids, specifically Cannabidiol (CBD) or Tetrahydrocannabinol (THC), using Ethanol is accomplished by soaking the appropriate plant material, such as Hemp or Marijuana, in Ethanol. This allows the solvent properties of Ethanol to extract useful substances, namely Cannabinoids, from the plant material. But, unwanted plant material, such as Chlorophyll or waxes, is extracted by the Ethanol as well. The extraction of unwanted plant material is due to the polar nature of Ethanol while the process occurs at temperatures exceeding 0 degrees C. Further purification, such as winterization, is required to remove the unwanted plant material, increasing the time, effort, and capital required to produce quality CBD or THC. As the temperature of the Ethanol decreases, the extraction of unwanted plant material also decreases. Once the temperature is below that of −60 degrees C., further purification becomes unnecessary. Thus, CBD or THC extraction with super-cooled Ethanol is extremely efficient, and a method of chilling the Ethanol rapidly to very low temperatures becomes increasingly desirable. The preferred embodiment is capable of the rapid chilling of Ethanol to very low temperatures.

Typical processes to manufacture CBD or THC may use walk-in freezers to chill the Ethanol to temperatures around −30 degrees C. This significantly decreases CBD or THC manufacture time because of three reasons: 1. It takes relatively more time and effort to move Ethanol into and out of such freezers; 2. The cooling rate of the Ethanol within such freezers is relatively slow; and 3. The temperatures within such freezers are often only −30 or −40 degrees C., further decreasing the cooling of the Ethanol within them.

The capability to rapidly chill Ethanol to ultra-cold temperatures (−90 degrees C.) is also useful in a laboratory setting where experiments are performed using the chilled Ethanol. More experiments and research can be done in a set period of time as the speed at which the Ethanol is chilled increases.

A significant problem with current Ethanol chillers is the inability to cool quickly. This is due mainly to the characteristic of the Ethanol chemical, in that at colder temperatures, especially below −30 degrees C., Ethanol increases in viscosity, meaning it becomes thick like honey. This increased viscosity creates two problems: 1. Heat exchangers become clogged, or even frozen, and barely function; and 2. Pumps used to increase convection across the heat exchanger become inefficient or even fail.

An additional problem with current Ethanol chillers is that the majority are mechanical and as such are unable to cool below a temperature determined by the chiller refrigerant. Typically, their range is limited to a much higher temperature than the −196 degrees C. of the liquid Nitrogen, making it nearly impossible to attain the −90 degrees C. Ethanol temperature.

SUMMARY

In one aspect, a chiller includes an insulated vessel, wherein the insulation can be foam, vacuum, Vacuum Insulated Panels (VIPs), or any combination therein; a heat exchanger, wherein the heat exchanger is comprised of a coolant tube that is within the insulated vessel, further comprising one or more cryogenic valves coupled to the heat exchanger; and a cryogenic tank with pressure building capability to force the coolant through the heat exchanger.

In another aspect, a chiller system includes a heat exchanger specifically designed for the increased viscosity of Ethanol in extremely low temperature conditions, and a cryogenic pump that operates efficiently to provide superior convection around the heat exchanger under these extreme conditions.

In yet another aspect, an alcohol-based solvent chiller includes a liquid Nitrogen inlet capable of convenient attachment to a customer's liquid Nitrogen supply;

a cryogenic flow system that operates at a predetermined Nitrogen flow between 22 and 150 psi;

an insulated vessel containing an alcohol-based solvent;

a heat exchanger of specific design to optimize heat transfer from the alcohol-based solvent within the insulated vessel by limiting locations where the alcohol-based solvent can congeal and be shielded from fluid flow while still having a large surface area in contact with the alcohol-based solvent;

a filling pump system that pumps from a customer's alcohol-based solvent storage into the insulated vessel;

a filling flow sensor that senses when alcohol-based solvent is being pumped by the filling pump system;

an outflow system that regulates whether the alcohol-based solvent is circulating back into the insulated vessel or being drained;

a draining pump system that pumps the alcohol-based solvent from the insulated vessel into the outflow system;

a draining flow sensor that senses when alcohol-based solvent is being pumped by the draining pump system;

a thermal box immediately outside the insulated vessel that effectively thermally seals the insulated vessel from the outside environment, significantly reducing heat gain;

an electronic controller that maintains a temperature setpoint for the insulated vessel, determined by the operator;

electronics and mechanics that controls the alcohol-based solvent temperature within the insulated vessel constantly; and an electronic controller that maintains the influx and outflow of alcohol-based solvent, determined by the operator.

In another aspect, an alcohol-based solvent chiller system is designed for chilling a customer's alcohol-based solvent at an extremely fast rate and with greater simplicity and efficacy when compared to prior art products, to temperatures as low as −90 degrees C. The alcohol-based solvent chiller is comprised of a large insulated vessel, an inlet for the customer's supply of a cryogenic liquid, such as Nitrogen, heat exchangers transferring the heat from the alcohol-based solvent to the cryogenic liquid through fast convective chilling.

One embodiment relies upon effective use of Nitrogen to chill the Ethanol. The effectivity of Nitrogen is enhanced by maintaining the liquid Nitrogen temperatures of down to −196 degrees C. throughout a major portion of the heat exchanger and not just at the entry port. When liquid Nitrogen absorbs energy too quickly, it phase-changes to a gas, which phase has an increased temperature and lower cooling ability, thus decreasing the effectiveness of the Nitrogen in cooling applications. A special design is employed to keep the Nitrogen in an extremely cold liquid condition throughout the entire heat exchanger to maintain the liquid Nitrogen's exceptional energy absorption capabilities. This is accomplished by using components that deliver extremely high flow cryogen: a high-pressure liquid Nitrogen source, a large cross-sectional flow path, a novel heat exchanger design, and a high-flow type solenoid valve.

One embodiment contains a heat exchanger designed for the increased viscosity of Ethanol in extremely low temperature conditions has such a design that limits the ability of the heat exchanger to trap the viscous Ethanol even with increased convection. An example of a heat exchanger with great ability to trap viscous Ethanol would be a typical heat exchanger where many fins are placed parallel to each other. Ethanol congeals between these fins and effectively decreases the surface area of the heat exchanger significantly, as well as limiting the heat transfer from the bulk of the Ethanol to the heat exchanger. An example of a heat exchanger with limited ability to trap congealed Ethanol would be one consisting of spiral tubing. Ethanol that does congeal on the surface of the heat exchanger isn't shielded from the liquid flow around it and cannot inhibit the heat exchangers ability to transfer heat from the Ethanol. The preferred embodiment has a heat exchanger with limited ability to trap congealed Ethanol.

Advantages of the system may include one or more of the following. The process uses cryogenic coolants such as liquid nitrogen for efficiently chilling alcohol-based solvents in connection with maximizing the purity and yield of valuable products during their extraction from *Cannabis*. The preferred embodiment has the capability of cooling 130 gallons of a liquid to −90 degrees C. in three hours. The extremely low ethanol temperature combined with the very rapid cooling time are the key elements in making this a far superior product over current chillers. This is accomplished using liquid Nitrogen, having a boiling point of −196 degrees C. which is significantly lower than traditional coolants. Using liquid Nitrogen negates the usage of mechanical compressors, significantly reducing energy usage and maintenance. The system provides a streamlined process of filling up with Ethanol, chilling the Ethanol, and then draining the Ethanol. This is accomplished with pumps and valves and require no manual movement of the Ethanol. The system can chill the Ethanol extremely fast and can rapidly cool Ethanol to temperatures down to −90 degrees C. as well as deliver the Ethanol conveniently, safely, and efficiently.

DESCRIPTION

A detailed description of the preferred embodiment is provided herein. It is to be understood, however, that the preferred embodiment may be embodied in various forms. Therefore, specific details disclosed herein are not to be interpreted as limiting, but rather as a basis for the claims and as a representative basis for teaching one skilled in the art how to employ the preferred embodiment in virtually any appropriately detailed system.

Figure 1:
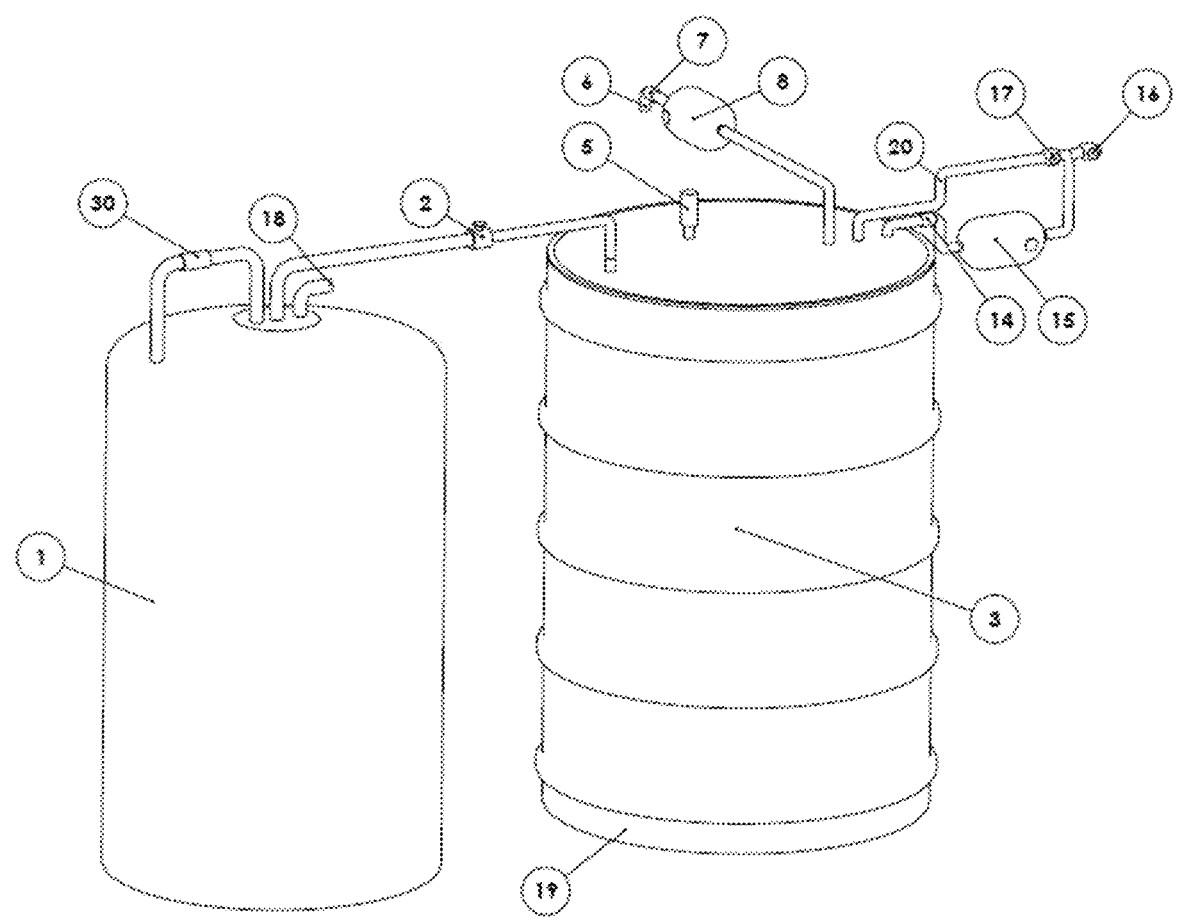
FIG. 1 is an exemplary 3D perspective view of the Chiller System.
Figure 2:
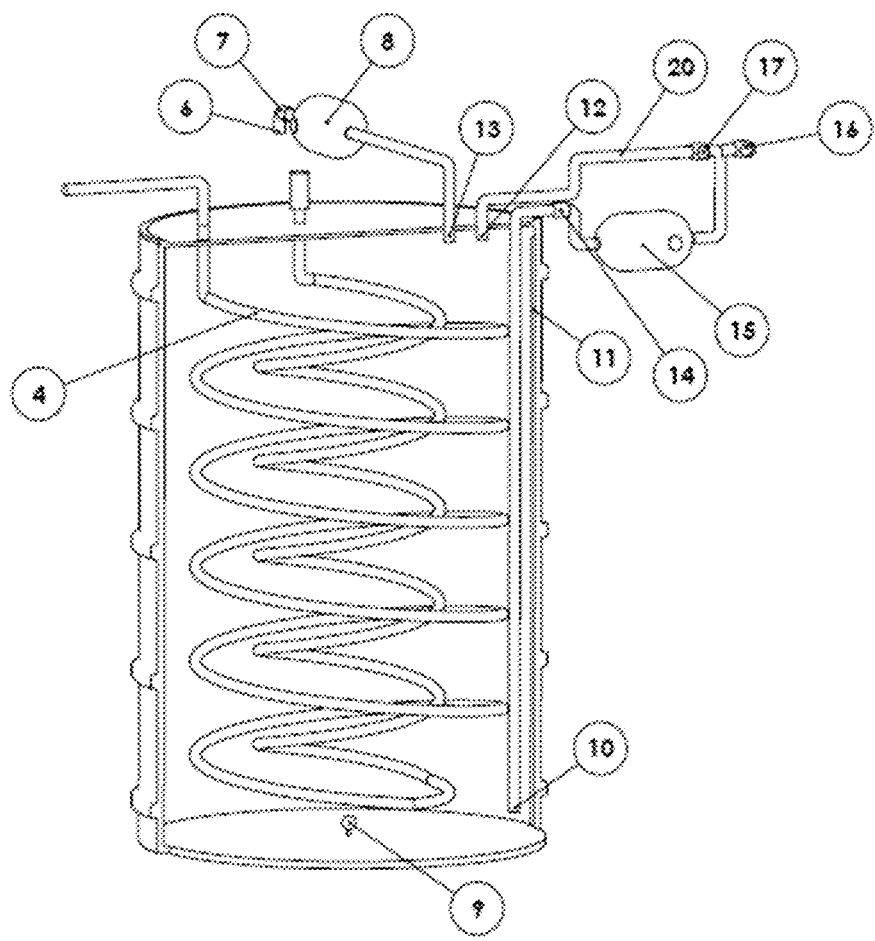
FIG. 2 is an exemplary 3D perspective view of the interior of the Chiller System.
Figure 3:
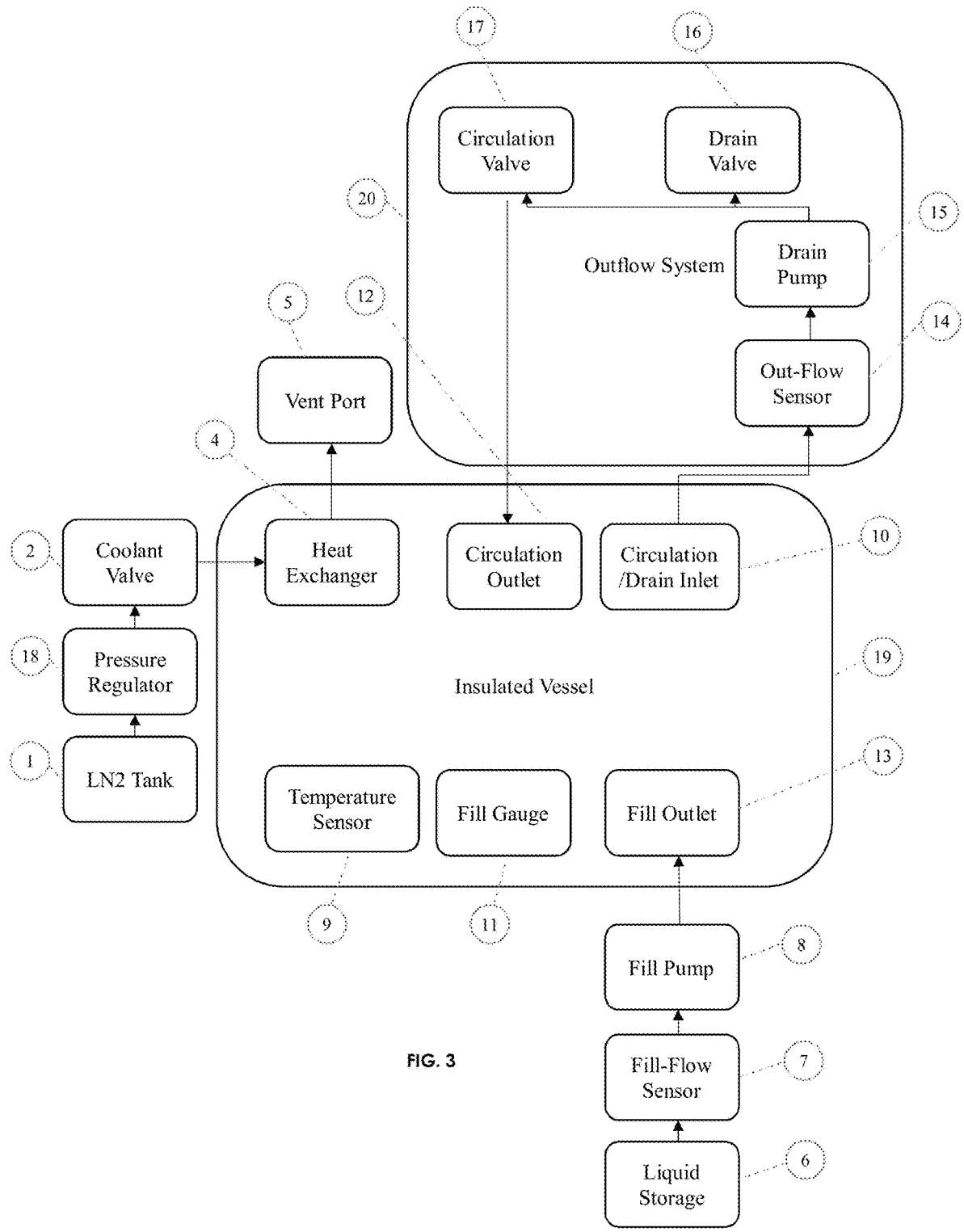
FIG. 3 shows an exemplary Chiller System.

Now referring to FIGS. 1 through 3, the preferred embodiment is a liquid chiller system 3 with an insulated vessel 19 that contains insulation, such as foam, vacuum, Vacuum Insulated Panels, or any combination therein. The insulation substantially reduces the heat gain within from the environment. A heat exchanger 4 consists of tubing making two spirals whose total length measures 200 feet. The heat exchanger 4 connects to a consumer's LN2 tank 1 that is maintained at 100 psi by an internal or external pressure builder 30 and a pressure regulator 18. A coolant valve 2 controls the flow of LN2 into the heat exchanger 4. The LN2 is exhausted at the end of the heat exchanger 4 at a vent port 5. A fill pump 8 draws liquid from a consumer's liquid supply 6 and into the insulated vessel 19 at a fill outlet 13. A fill-flow sensor 7 senses when liquid is flowing through the fill pump 8 to prevent damage when no liquid is flowing. A fill gauge 11 senses how full the insulated vessel 19 is.

As LN2 flows through the heat exchanger 4, heat is transferred from the liquid to the LN2, rapidly lowering the temperature of the liquid. A temperature sensor 9 senses the temperature of the liquid. A drain pump 15 draws the liquid out of the insulated vessel 19 from a circulation/drain inlet 10, as appropriate, and into the outflow system 20, consisting of a parallel circuit of a drain valve 16 and a circulation valve 17. The drain valve 16 removes the liquid from the liquid chiller system 3. The circulation valve 17 circulates the liquid back into the insulated vessel 19 through a circulation outlet 12. The circulation provides high flow past the heat exchanger 4 which prevents icing, creates rapid heat transfer, and gives the liquid uniform temperature. A drain-flow sensor 14 senses when liquid is flowing through the drain pump 15 to prevent damage when no liquid is flowing.

One embodiment relies upon effective use of Nitrogen to chill the Ethanol. The effectivity of Nitrogen is enhanced by maintaining the liquid Nitrogen temperatures of down to −196 degrees C. throughout a major portion of the heat exchanger and not just at the entry port. When liquid Nitrogen absorbs energy too quickly, it phase-changes to a gas, which phase has an increased temperature and lower cooling ability, thus decreasing the effectiveness of the Nitrogen in cooling applications. A special design is employed to keep the Nitrogen in an extremely cold liquid condition throughout the entire heat exchanger to maintain the liquid Nitrogen's exceptional energy absorption capabilities. This is accomplished by using components that deliver extremely high flow cryogen: a high-pressure liquid Nitrogen source, a large cross-sectional flow path, a novel heat exchanger design, and a high-flow type solenoid valve.

The heat exchanger designed for the increased viscosity of Ethanol in extremely low temperature conditions has such a design that limits the ability of the heat exchanger to trap the viscous Ethanol even with increased convection. An example of a heat exchanger with great ability to trap viscous Ethanol would be a typical heat exchanger where many fins are placed parallel to each other. Ethanol congeals between these fins and effectively decreases the surface area of the heat exchanger significantly, as well as limiting the heat transfer from the bulk of the Ethanol to the heat exchanger. An example of a heat exchanger with limited ability to trap congealed Ethanol would be one consisting of spiral tubing. Ethanol that does congeal on the surface of the heat exchanger isn't shielded from the liquid flow around it and cannot inhibit the heat exchangers ability to transfer heat from the Ethanol. The preferred embodiment has a heat exchanger with limited ability to trap congealed Ethanol.

The preferred embodiment solves the problems of effectively chilling alcohol-based solvents by: 1. A heat exchanger designed for the increased viscosity of Ethanol in extremely low temperature conditions, and 2. A special cryogenic pump that operates efficiently to provide superior convection around the heat exchanger under these extreme conditions. The system advantageously offers a streamlined process of filling up with Ethanol, chilling the Ethanol, and then draining the Ethanol. This is accomplished with pumps and valves and require no manual movement of the Ethanol. The system can chill the Ethanol extremely fast as previously explained; and can rapidly cool Ethanol to temperatures down to −90 degrees C.

Figure 4:
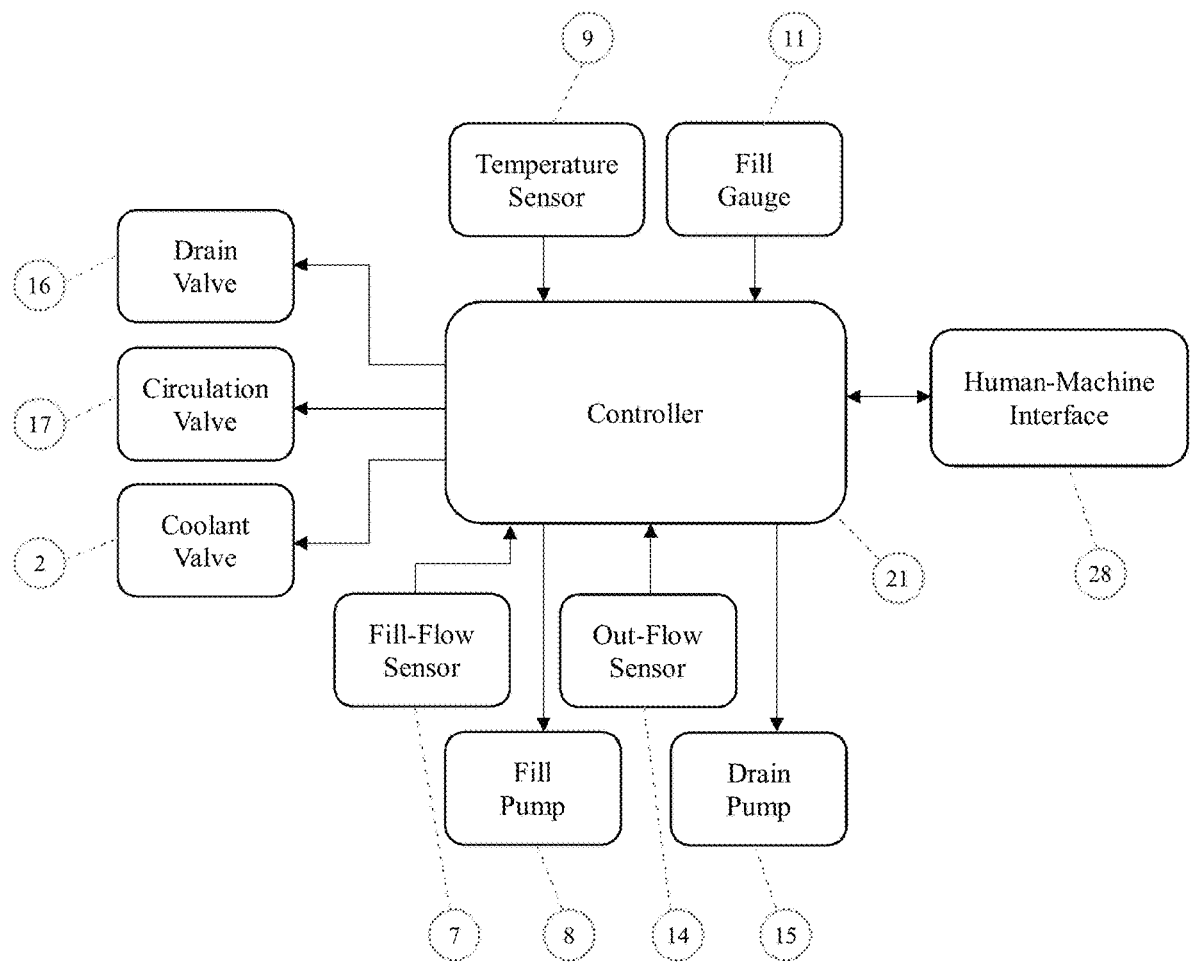
FIG. 4 shows an exemplary controller for the Chiller System.

FIG. 4 shows an exemplary controller 21 that a liquid chiller uses. The controller 21 receives signals from a fill-flow sensor 7 and an out-flow sensor 14. The fill-flow sensor 7 and out-flow sensor 14 senses when liquid is flowing to a fill pump 8 and a drain pump 15, respectively. If no liquid is flowing to the fill pump 8 or drain pump 15 the controller 21 turns off the fill pump 8 or drain pump 15. A fill gauge 11 sends a signal to the controller 21 of how much liquid is in the insulated vessel 19. A temperature sensor 9 senses the temperature of the liquid within the insulated vessel 19 and sends this information to the controller 21. The controller 21 enables and disables a circulation valve 17, drain valve 16, and coolant valve 2 as appropriate. A human-machine interface 29 receives input from the operator and sends it to the controller 21 as well as displays input from the controller 21 to the operator.

Figure 5:
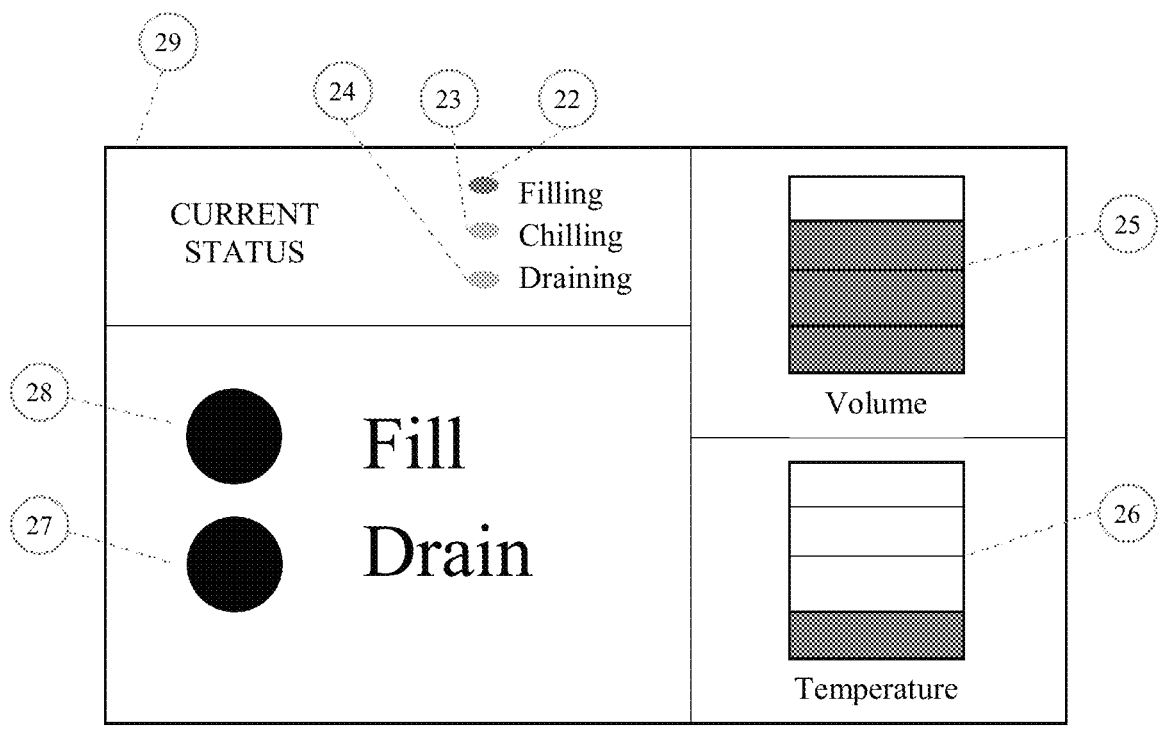
FIG. 5 shows an exemplary Human-Machine Interface for the Chiller System.

FIG. 5 shows an exemplary human-machine interface 29. The human-machine interface 29 displays a volume graph 25 of the liquid as sensed by the fill gauge 11 as well as a temperature graph 26 of the liquid as sensed by the temperature sensor 9. A filling indicator 22, chilling indicator 23, and a draining indicator 24 are displayed on the human-machine interface 29 and indicate when the liquid chiller system 3 is filling with liquid, chilling the liquid, and draining the liquid, respectively. A fill button 28 and a drain button 27 are displayed on the human-machine interface 29. The liquid chiller system 3 begins to fill the insulated vessel 19 after the fill button 28 is pressed and automatically starts to chill the liquid after the insulated vessel 19 is full. The liquid chiller system 3 begins to drain the insulated vessel 19 after the drain button 27 is pressed.

An exemplary process that could be implemented with the liquid chiller system 3 follows. The operator presses the fill button 28 and the liquid chiller system 3 begins to fill the insulated vessel 19 with Ethanol. Once the insulated vessel 19 is full, the liquid chiller system 3 chills the ethanol to −90 degrees Celsius. The operator then presses the drain button 27 and the liquid chiller system 3 begins to evacuate the insulated vessel 19 of ethanol to be used to extract cannabidiol.

An exemplary process of the liquid chiller system 3 follows. The coolant valve 2 receives a signal from the controller 21 to allow liquid Nitrogen to flow at 100 psi through the heat exchanger 4. The heat exchanger draws heat from liquid within the insulated vessel 19 and dispels it into the liquid Nitrogen, rapidly cooling the liquid to cryogenic temperatures. The drain pump 15 draws liquid from within the insulated vessel 19 and circulates it back through the circulation valve 17 and back into the insulated vessel 19, maintaining even temperature of the liquid.

In another aspect, a chiller system includes a heat exchanger designed for the increased viscosity of Ethanol in extremely low temperature conditions, and a cryogenic pump that operates efficiently to provide superior convection around the heat exchanger under these extreme conditions.

The preferred embodiment eliminates the problems of complex methods of using chilled Ethanol by: 1. Having a streamlined process of filling up with Ethanol, chilling the Ethanol, and then draining the Ethanol. This is accomplished with pumps and valves and require no manual movement of the Ethanol; 2. Chilling the Ethanol extremely fast as previously explained; and 3. Maintaining the ability to rapidly cool Ethanol to temperatures down to −90 degrees C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A chiller, comprising:
a liquid Nitrogen inlet capable of attachment to a liquid Nitrogen supply;
a cryogenic valve that operates at a predetermined Nitrogen pressure between 22 and 200 psi;
an insulated vessel containing a liquid;
a heat exchanger to optimize heat transfer from the liquid within the insulated vessel by limiting locations where the liquid congeals and shielded from fluid flow;
a filling pump that pumps from a liquid storage into the insulated vessel;
a filling flow sensor that senses when liquid is being pumped by the filling pump system;
a valve that regulates whether the liquid is circulating back into the insulated vessel or being drained;
a draining pump that pumps the liquid from the insulated vessel into the valve;
a draining flow sensor that senses when the liquid is being pumped by the draining pump;
a thermal box immediately outside the insulated vessel that thermally seals the insulated vessel from an outside environment;
an electronic controller that maintains a temperature setpoint for the insulated vessel and controls the liquid's temperature within the insulated vessel.

2. The chiller of claim 1, wherein the heat exchanger reduces the ability of alcohol-based solvents to congeal.

3. The chiller of claim 1, wherein the heat exchanger comprises smooth tubing, finned tubing, or any combination thereof.

4. The chiller of claim 1, comprising a liquid Nitrogen coolant or a cryogenic fluid.

5. The chiller of claim 1, comprising an interactive Human-Machine Interface (HMI).

6. The chiller of claim 1, wherein the pressure of coolant flowing through the heat exchanger is between about 22 to 200 psi.

7. The chiller of claim 1, wherein the insulated vessel is separated from an outside environment by an insulation.

8. The chiller of claim 1, wherein the insulation is comprised of foam, vacuum, Vacuum Insulated Panels (VIPs), or any combination therein.

9. The chiller of claim 1, wherein the insulated vessel is separated from an outside environment by an insulation of up to 6 inches.

10. The chiller of claim 1, comprising a flow sensor that ensures liquid is flowing through the pump.

11. The chiller of claim 1, comprising a controller coupled to a thermocouple and a fill gauge located within the insulated vessel, wherein the thermocouple measures temperature, the fill gauge measures a volume of the liquid within the insulated vessel, and the controller controls the flow of coolant into the heat exchanger as well as the flow of the liquid into and out of the insulated vessel.

12. The chiller of claim 1, comprising cryogenic valves to control the flow of viscous liquids.

13. The chiller of claim 5, comprising a solenoid valve to control a flow of the liquid Nitrogen.

14. The chiller of claim 1, wherein the liquid that flows out of the insulated vessel is used to extract cannabinoids from *cannabis*.

15. The chiller of claim 1, wherein drained liquid from the draining pump is used to extract cannabinoids at a predetermined yield rate from *cannabis*.

16. A method of cooling a chiller with a liquid Nitrogen inlet capable of attachment to a liquid Nitrogen supply; a cryogenic valve that operates at a predetermined Nitrogen pressure between 22 and 200 psi; an insulated vessel containing a liquid; a heat exchanger to optimize heat transfer from the liquid within the insulated vessel by limiting locations where the liquid congeals and shielded from fluid flow; a filling pump that pumps from a liquid storage into the insulated vessel; a filling flow sensor that senses when liquid is being pumped by the filling pump system; a valve that regulates whether the liquid is circulating back into the insulated vessel or being drained; a draining pump that pumps the liquid from the insulated vessel into the valve; a draining flow sensor that senses when the liquid is being pumped by the draining pump; a thermal box immediately outside the insulated vessel that thermally seals the insulated vessel from an outside environment; an electronic controller that maintains a temperature setpoint for the insulated vessel and controls the liquid's temperature within the insulated vessel, comprising:

providing plant component as a liquid; and extract oil from plant components.

17. The method of claim 16, comprising extracting cannabinoids from *cannabis*.

* * * * *